(12) United States Patent
Bleijenberg et al.

(10) Patent No.: US 6,727,328 B1
(45) Date of Patent: Apr. 27, 2004

(54) CONTROLLED SHEAR AND TURBULENCE FLOW PATTERN WITHIN A LIQUID IN A VESSEL

(75) Inventors: Karel Cornelis Bleijenberg, Breda (NL); Grazyna Petela, Calgary (CA)

(73) Assignee: Nova Chemicals Inc., Moon Township, PA (US)

( * ) Notice: Subject to any disclaimer, the term of this patent is extended or adjusted under 35 U.S.C. 154(b) by 11 days.

(21) Appl. No.: 10/266,840

(22) Filed: Oct. 8, 2002

(51) Int. Cl.$^7$ ................................................. C08F 2/12
(52) U.S. Cl. .............................. 526/88; 526/67; 526/71; 526/78; 526/81; 526/235; 526/236; 523/313
(58) Field of Search ............................ 526/67, 71, 78, 526/81, 88, 235, 236; 523/313

(56) References Cited

U.S. PATENT DOCUMENTS 4,666,673 A * 5/1987 Timm ........................ 526/88 X
4,680,320 A * 7/1987 Uku et al. .................... 523/313

OTHER PUBLICATIONS

A. Nienow, D. Wisdom, J. Middleton, The Effect of Scale and Geometry on Flooding, Recirculation, and Power in Gassed Stirred Vessels, 2nd European Conference, Mar. 30–Apr. 1, 1977.

C. Chapman, A. Nienow, M. Cooke, and J. Middleton, Particle–Gas–Liquid Mixing in Stirred Vessels, Chem Eng. Res Des. vol. 61 Mar. 1983, pp. 82–95.

M. Warmoeskerken and J. Smith, The Flooding Transition with Gassed Rushton Turbines, Symposium Series No. 89, 1984, pp. 59–66.

A. Nienow, M. Warmoeskerken, J. Smith and M. Konno, On the Flooding/Loading Transition and the Complete Dispersal Condition in Airated Vessels Agitated by a Rushton–Turbine, 5th European.

Conference on Mixing, Wurzburg, West Germany, Jun. 10–12, 1985, paper 15, p. 143154.

W. Bujalski, M. Konno and A. Nienow, Scale–Up of 45° Pitch Blade Agitators for Gas Dispersion and Solid Suspension, 6th European Conference on Mixing, Pavia, Italy, May 24–26, 1988, pp. 389–398.

\* cited by examiner

*Primary Examiner*—Fred Teskin (57) ABSTRACT

The present invention provides a process to create without mechanical agitation a zone of low shear, low turbulence flow pattern within a continuous phase liquid contained in a vessel by a continuous or periodic injection of an inert, immiscible, low density fluid, preferably gas, into the liquid to form such a flow pattern, recovering the fluid above the free surface of the liquid and, preferably, reinjecting it into the liquid. The invention is particularly useful if the continuous liquid contains a dispersed phase which should be distributed within the continuous liquid without excessive particle agglomeration or breakups in order to largely preserve the initial particle size distribution, or if the initial particle size distribution needs to be modified by controlled breakups of the largest particles, particularly during the subsequent batch processing.

24 Claims, 6 Drawing Sheets

CONTROLLED SHEAR AND TURBULENCE FLOW PATTERN WITHIN A LIQUID IN A VESSEL

FIELD OF THE INVENTION

The present invention relates to a method to create without mechanical agitation a low shear low turbulence flow pattern within a continuous liquid phase contained in a vessel, by continuously or periodically injecting and preferably recycling a neutral immiscible lighter (less dense) fluid, preferably gas, below the free surface of the continuous phase. In one embodiment of the present invention the continuous liquid phase further comprises a dispersed phase which needs to be distributed within continuous phase without particle agglomeration or excessive (e.g. not more than 15%, preferably not more than 8%) breakup in order to either preserve or to slightly modify (reduce) the initial size distribution of the particles for subsequent batch processing.

BACKGROUND OF THE INVENTION

There is a prior art relating to the injection of gas into a continuous liquid phase in sparging and, less often, surface aeration systems. Mechanically agitated tanks are usually used for this task and the main purpose of these systems is to disperse a gaseous component within a liquid component, (e.g. ethylene gas in liquid styrene) for further processing. Other applications involve high pressure gas injection to aid mechanical agitation/stirring by intensifying the mixing and increasing turbulence level in a stirred tank. All these systems operate in highly turbulent regimes and are equipped with mechanical agitators, (Wessner et al 2002, Nienow et al 1977, Nienow et al 1985a, Tatterson 1991, Bujalski 1988, Warmoeskerken et al 1984, Chapman et al 1983). There are also numerous applications of in situ gas injection to remediate contaminated aquifers or soil matrix, but they serve totally different purpose and operate on different principles than process described in the present invention.

The applicants have been unable to locate any art, which discloses the subject matter of the present invention (i.e. injection of an inert immiscible lighter or less dense fluid into a continuous liquid phase to create a low shear low turbulence, (preferably laminar), flow pattern within a continuous phase contained in a vessel. If the continuous phase optionally further comprises a dispersed phase, the present invention provides the mechanism to create, with no mechanical agitation, a laminar low shear flow pattern to suspend and to distribute, preferably relatively uniformly, the dispersed phase within a volume or a portion of the continuous phase, with minimum interaction between particles particularly during subsequent processing. The application of such a flow pattern can be useful in any process where the substrate (liquid or solid) is dispersed as a suspension or an emulsion or as a particle cloud in an immiscible continuous phase and the dispersed phase may be further batch processed or undergo a chemical reaction (e.g. polymerization) with the requirement to substantially (e.g. 90%, most preferably 95%) preserve or, optionally, to modify (decrease) (e.g. up to 15%, preferably 8% of the largest particle size) the initial size distribution.

In conventional processes, a phase to be processed, dispersed in a continuous liquid phase is usually subjected to some form of mechanical agitation. If the initial particle size distribution of the dispersed phase, which may have been obtained by any means including pressure atomization, extrusion, mechanical agitation, jet cutting or other means of disintegration, is to be maintained during further processing or chemical reaction, the agitation needs to produce low enough shear and low turbulence flow so as not to cause particles to agglomerate or not to cause further particle break up. With conventional mechanical agitation it is difficult to generate a low turbulence, uniform shear field as the velocity gradient along an agitator blade is a function of the liquid properties, the speed of rotation and the distance from the agitator shaft. Accordingly the shear is highly non-uniform and generally the level of turbulence is high and this tends to change the initial particle size distribution into a new, usually a normal, distribution of particle sizes.

The present invention seeks to provide a method of generating a low shear, low turbulence, in some applications preferably laminar, zone within a continuous liquid phase in a vessel, with no mechanical agitation. If dispersed particles are comprised in the continuous liquid they flow within this zone with minimum mutual interaction, remaining submerged and thoroughly (uniformly) distributed within the continuous liquid volume during subsequent processing. In such environment, the initial particle size distribution can be largely preserved or, optionally, the initial particle size distribution can be modified (e.g. slightly reduced) or improved by some controlled breakups of the largest particles. (e.g. the largest 10% of the particle size distribution).

Optionally, in one embodiment of the invention, the particle size distribution of the discontinuous phase may be reduced by causing a secondary breakup of the majority (at least 85%) of the particles or the droplets dispersed in the continuous phase.

The method can be applied in processes where density ratios between dispersed and continuous phases are higher and lower than 1 within the range of ±20%.

SUMMARY OF THE INVENTION

The present invention provides a process for creating a low shear flow pattern with a controlled low turbulence level, without mechanical agitation, in a continuous liquid phase contained a vessel, comprising continuously or periodically injecting into selected part(s) of the vessel one or more streams of fluid immiscible and inert to the vessel contents and having a density lower than the reactor contents, and retrieving this fluid above free surface of liquid phase and, preferably, reinjecting it back to the vessel.

DETAILED DESCRIPTION

In the present invention both the continuous and dispersed phases can be either Newtonian or non-Newtonian liquids, preferably immiscible liquids.

The dispersed phase can be a visco-elastic liquid, liquid-solid mixture or can comprise solid or coated particles or liquid droplets, (e.g. visco-elastic or slurry). In one preferred embodiment the dispersed phase are pressure atomized droplets of a partially polymerized mixture of one or more monomers.

The injected fluid can be a Newtonian or non-Newtonian liquid, inert and immiscible with both continuous and dispersed phases and having a density different, preferably substantially lower than both phases, or most preferably it can be an inert gas. Typically the gas should not be soluble in both phases.

As used in this specification, particles may be solid or liquid or solid-in-liquid and droplets are liquid.

As used in this specification non-Newtonian means a liquid which does not have a linear relationship between shear stress and fluid strain rate. Generally non-Newtonian liquids exhibit shear thinning (pseudoplastic) or shear thickening (dilatent). All gases, water (salt and fresh) and most unpolymerized hydrocarbons are Newtonian liquids.

As used herein visco-elastic liquid means a liquid that has conjoint viscous and elastic properties. Typically these materials tend to be more viscous than water and if deformed under shear will tend to return to their pre-shear condition if the shear is removed.

In accordance with the present invention the continuous phase is, preferably, initially stationary and contained in a vessel. Preferably it contains a dispersed phase with sufficiently different density, so the dispersed particles left without intervention either tend to form a layer at the free surface of the continuous phase or tend to sediment on the bottom of the vessel. The dispersed phase is subsequently to be further processed or to undergo chemical reaction. The initial size distribution of the dispersed phase may have been obtained as the result of mechanical agitation, atomization, extrusion, jet cutting or by any other dispersion method. During the subsequent processing or polymerization, the liquid droplets or solid particles of the dispersed phase should usually remain submerged below the free surface of the continuous phase and be thoroughly (uniformly) distributed in the continuous phase in a way that minimize their interaction, (e.g. particle or droplet collision) but also provides other requirements, for example an adequate heat transfer.

If the initial particle size distribution needs to be preserved to the largest extent during processing, the dispersed particles, ideally, should be distributed uniformly within a volume of the continuous phase exposed to a low shear and remain in a laminar motion within the continuous phase.

There is also an option that the initial particle size distribution may be modified to become more uniform and slightly reduced in diameter. In this option, a certain percentage of the largest particles (e.g. the largest 15% of the particle size distribution) in the population are broken in a controlled manner, by being exposed to low turbulence low shear flow pattern in the continuous phase.

In a further embodiment the entire particle size distribution can be reduced by causing a secondary break up of majority (e.g. of at least 85%) of the droplets in the dispersed phase.

In accordance with the present invention, the required flow pattern can be created in the vessel by injecting one or more streams of a fluid having a density substantially lower than the continuous and dispersed phases and inert and immiscible with the reactor contents, into selected locations, preferably including the bottom parts of the reactor or vessel volume. The fluid may be continuously or periodically injected, (to prevent the dispersed phase from sinking to the bottom of the reactor or from rising to the free surface of the continuous phase), with a controlled frequency of injection depending on ratios of the densities and amounts of the continuous and dispersed phases.

Preferably, such a fluid with a sufficiently low density suitable for injection is a gas. The gas may be selected from the group consisting of inert gases, preferably not soluble in both phases, air and nitrogen, preferably nitrogen. The gas may be injected into the continuous phase at pressure up to 15 bar (gauge) (e.g. from 0.001 to 15 bar gauge). The gauge pressure referred to in this specification is the difference between the absolute static gas pressure, upstream the injection port, and the combined (sum of) hydrostatic pressure of continuous liquid in a vessel and an absolute ambient static pressure above free surface of continuous phase.

If gas is selected as the fluid injected to the reactor, two modes of injection are possible.

The first and preferred mode of injection is to inject gas at low pressure (preferably less than 3 bar gauge, most preferably less than or equal to 1 bar gage) through the injection ports, so the injected gas forms streams of bubbles in the continuous phase downstream the injection ports, with the average size of a bubble substantially larger than the average size of the dispersed particles. Due to the balance of buoyancy, gravity and drag forces, the bubble stream rises towards the free surface of the continuous phase where the gas is recovered and, preferably, recycled back to the vessel. As the gas bubble stream flows towards the free surface, it interacts with the continuous liquid phase and its momentum creates a flow pattern in the reactor, forcing the continuous phase into a circular low shear, low turbulence motion creating a recirculation zone in the reactor. The velocity gradients and geometry of the generated zone can be controlled by the geometry (number, diameters and locations) of the gas injection ports and by gas flow rate. The dispersed particles flow within the recirculation zone and are subjected to the sufficiently low shear rate and turbulence so that they remain submerged without excessive mutual interaction, their momentum being sufficiently low, so even if they collide—the probability of agglomeration or breakup resulting from such a low impact collision remains very low. This motion of particles can be maintained for particles which are lighter than the continuous phase and for the particles which are heavier than the continuous phase, providing that the density difference between dispersed and continuous phase is typically within the range of ±20% (i.e. the ratio of the density of the dispersed phase to the density of the continuous phase may range from 0.8:1 to 1.2:1).

Preferably, the injection ports have diameters substantially (e.g. at least two times, typically five,) larger than the average diameter of the dispersed particles. The locations of the gas injection ports are selected based on the concentration of the dispersed phase and the dispersed particle density. Generally, the injection ports should be located in the reactor below the layer of the dispersed phase contained in the continuous phase. Accordingly, to submerge dispersed particles having a density lower than the density of the continuous phase and to prevent their floating motion, the injection ports should be beneath the floating particle/droplet layer and can be located in the reactor walls or in the bottom.

To elevate particles/droplets heavier than continuous phase and to prevent their sedimentation on the vessel bottom, some of the injection ports have to be located in the bottom of the reactor. In this case, a modification of the geometry of the reactor bottom, e.g. into an inverted conical or frustro-conical type of a shape, may be desirable. In one embodiment of the present invention (FIG. 1) the reactor bottom is inverted conical, with one injection port situated in the tip of the cone and two other ports located tangentially to the cone cross section, at the level of half-height of the cone.

If the density of the dispersed particles changes during the process, as for example during polymerization of the dispersed monomer droplets, a combination of both types of port arrangements (i.e. in the reactor walls and bottom) can be used. The most useful general arrangement of the port locations is with the main ports located in the reactor bottom and, optionally, some supporting ports in the lower parts (bottom half, preferably bottom quarter) of the reactor walls.

Mainly, the gas injection rate determines the level of turbulence in the created flow pattern in the reactor. The gas injection rate will depend on a number of factors including the volume and density ratios of the dispersed and continuous phases; the viscosity of the continuous phase; the geometry of the vessel; and the size of the particles of the dispersed phase. Suitable gas injection rates may be determined by one skilled in the art by repeating experiments similar to those contained herein.

Generally, to preserve the initial size distribution of the dispersed particles or droplets to the largest extent, the level of turbulence of the continuous flow phase in the reactor has to be sufficiently low so the motion of the reactor contents is laminar.

If required, the initial particle or droplet size distribution can be also modified to a certain extent during the processing by properly adjusting gas flow rate. Although the average particle size cannot be increased by a controlled agglomeration of particles, it can be reduced in some cases or improved towards a more uniform distribution by increasing the gas injection rate to cause the breakup of only the largest particles (e.g. the largest 15% of the particle size distribution) in the population. The breakup is caused by the controlled increase of the turbulence level within the flow pattern created by the gas bubbles and not by particle or droplet interaction (e.g. collision).

In a further embodiment of the present invention the average particle size of the dispersed phase can be substantially reduced by causing a break up a majority (at least 85%) of the droplets in the dispersed phase. In this embodiment a flow pattern with higher shear and turbulence level is generated in the continuous phase by applying larger gas injection rates, to break up the droplets.

The second mode of gas injection can be applied only in the processes where the dispersed particles which are to be distributed and suspended have a density lower than the continuous phase. In this mode gas is injected at high pressure, typically 5 bar (gauge) and above, to generate a large number of very small gas bubbles, distributed within the volume of the continuous phase. Preferably, the injection ports have diameters at least an order of magnitude, preferably, several orders of magnitudes smaller than the average diameter of the dispersed particles. The concentration of gas bubbles should be sufficiently high so the effective density of the continuous phase becomes reduced to a value lower than the density of the dispersed phase and, as the result, the dispersed particles start to sink. In this mode the periodic gas injection can be particularly useful in creating an "oscillatory" movement of the particles or droplets, as during the injection period the particles or droplets sink and next when gas supply is shut off and gas bubbles leave the continuous phase exiting through the free surface of the continuous phase, the particles rise from the bottom part of the of the vessel or reactor and float again towards the free surface. The next gas injection should take place before the particles of the dispersed phase reach the free surface of the continuous phase. The mechanism responsible for small size of bubbles is mainly turbulence of a gas stream. Bubbles rise towards the free surface, usually with high velocity, their residence time in a continuous phase is brief but the flow pattern generated in the continuous phase can be at a much higher turbulence level than in the first mode of injection. Therefore where necessary, care should be taken not to break floating particles or droplets. In this mode of injection, a high viscosity (typically 10 cP or higher) of the continuous phase is advantageous, as it slows down the gas bubbles increasing their residence time in the continuous phase and reduces the overall level of turbulence in the vessel.

The injected fluid could also be a liquid which is immiscible with both continuous and dispersed phases, inert to both phases and has density lower than density of the continuous and dispersed phases. After the injection, this liquid will form a stream or a spray of droplets within the continuous phase creating a low shear laminar zone where the dispersed phase flows and are distributed in a way similar to the above described pattern resulting from the low pressure gas injection (the first preferred mode of gas injection). The amount of the injected liquid should be sufficient to form a layer on the top of free surface of the continuous phase from which the liquid can be recovered and, preferably, recycled back to the injection ports in the reactor.

The dispersed phase may be present in the continuous phase in an amount from about 0.01 to 60 volume %, preferably from about 10 to 50 volume %, and most preferably from about 10 to 40 volume %.

The dispersed phase can be a liquid, liquid-solid mixture or can comprise solid or coated (e.g. gelatine or a coating applied using for example concentric nozzles) particles or liquid droplets.

The immiscible liquids useful in accordance with the present invention to form the dispersed phase may be either Newtonian or non-Newtonian fluids, preferably non-Newtonian liquids. Preferably the non-Newtonian liquids used as the dispersed phase in accordance with the present invention are visco elastic liquids. Newtonian liquids forming the dispersed phase may be the monomers listed below (e.g. polymerized 0% to a low, typically less than 5% conversion).

Non Newtonian and visco elastic liquids forming the dispersed phase may be partially polymerized monomers, typically polymerized at least to 5% generally from 5 to 45% preferably from 10 to 45% conversion or solutions of monomers listed below having dissolved there in polymers, generally of one or more of the solvent monomers, in an amount typically not less than 5 weight %, generally from 5 to 45 weight %, preferably from 10 to 45 weight %.

Typically the polymer will be a co or homopolymer of the monomers listed below. However other polymers may be used such as polyolefins (e.g. polyethylene), polycarbonates (polyphenylene oxides) and impact (rubber modified) forms of such polymers such as high impact polystyrene (HIPS). The impact modified polymers typically contain as a dispersed phase from about 2 to 30, weight % of one or more rubbers selected from the group consisting of:

(a) co- or homopolymers of $C_{4-6}$ conjugated diolefins (i.e. diene rubbers);

(b) random, block, and tapered copolymers comprising from 30 to 70, preferably from 40 to 60, weight % of one or more $C_{8-12}$ vinyl aromatic monomers which are unsubstituted or substituted by a $C_{1-4}$ alkyl radical; and from 70 to 30, preferably from 60 to 40 weight % of one or more $C_{4-6}$ conjugated diolefins (e.g. styrene butadiene rubbers or SBR); and (c) copolymers comprising from 5 to 50 weight % of acrylonitrile or methacrylonitrile and from 50 to 95 weight % of one or more $C_{4-6}$ conjugated diolefins (e.g. nitrile rubbers).

The polymers may also include acrylonitrile butadiene styrene (ABS) polymers and butyl acrylate (homopolymer) modified polyacrylates such as polymethyl methacrylate or styrene acrylates such as polymers comprising from about 5 to 50 weight % of methyl methacrylate and from about 50 to 95 weight % of a vinyl aromatic monomer as described above. The polymer may be a polyolefin such as polyethylene or copolymers of ethylene and up to about 20 weight % of a $C_{4-8}$ mono, preferably alpha, olefin such as butene, hexene and octene or a copolymer of ethylene and up to about 40 weight % of an ethylenically unsaturated carboxylic acid such as a copolymer of ethylene and acrylic acid. Such solutions of polymers in monomers are also non-Newtonian visco elastic immiscible liquids.

The monomers or mixture of monomers suitable for use in the present invention as the dispersed phase include one or more monomers which can be emulsion or suspension polymerized or solutions of polymers in one or more monomers which can be emulsion or suspension polymerized. Typically the one or more monomers may be selected from the group consisting of $C_{8-12}$ vinyl aromatic monomers which are unsubstituted or substituted by up to two substituents selected from the group consisting of $C_{1-4}$ alkyl radicals, acrylonitrile, methacrylonitrile, maleic anhydride, malimide, and $C_{1-4}$ alkyl esters of $C_{1-6}$ monocarboxylic acids.

Suitable vinyl aromatic monomers include styrene, alpha methyl styrene and para methyl styrene. Suitable alkyl esters of $C_{1-6}$ monocarboxylic acids include methyl methacrylate, ethyl methacrylate, butyl methacrylate, methyl acrylte, ethyl acrylate and butyl acrylate. In one embodiment of the present invention the discontinuous phase comprises from 100 to 60 weight % of styrene and from 0 to 40 weight % of one or more monomers selected from the group consisting of methyl methacrylate, ethyl methacrylate, butyl methacrylate, methyl acrylate, ethyl acrylate, and butyl acrylate. The dispersed phase may be polymerized up to 45% conversion, typically from 10 to 45% conversion or is a solution of monomers comprising up to 45%, typically from 10 to 45% of polymer (of one or more of the solvent monomers).

The monomers or mixtures of monomers per se tend to be Newtonian immiscible liquids.

Preferably the dispersed monomer is styrene which has been polymerized up to 45% conversion, typically from 10 to 45% conversion or is a solution of styrene comprising up to 45%, typically from 10 to 45% of polystyrene.

Particle movement through the suspension medium (i.e. the continuous phase) may be easier and will generate a lower shear when the viscosity of the continuous phase is the same order of magnitude or, preferably, less than the viscosity of the dispersed liquid. Lower viscosity of the continuous phase results also in a lower shear stress for a given velocity gradient. The movement of particles depends also on their size, with larger particles or droplets moving with higher velocity through the suspension medium than do smaller particles or droplets. However, with the decreasing viscosity of the continuous phase, gas bubbles of a given diameter move with a higher velocity towards free surface, creating a more turbulent flow pattern. So, if possible, a certain optimization of the viscosity of the continuous phase is advantageous for a given type of the dispersed and continuous phases.

Preferably, the suspension medium (e.g. the continuous phase) has a viscosity of less than about 120, more preferably less than 100 cP. The viscosity of the dispersed liquid can generally range from above 0.1 cP, up to infinity (e.g. solid particles, for liquids typically between 100 and 6,000), but it should be equal to or larger, preferably larger, most preferably at least an order of magnitude larger than the viscosity of the continuous phase.

In addition, the continuous phase can have a sufficiently different density from that of the dispersed phase, the density difference resulting in the rise or the descent of particles or droplets through the continuous phase. Preferably, the density of the suspending medium is greater than or equal to the density of the dispersed liquid droplets or particles, with the density of the suspension medium typically being from about 1.02, to about 1.2, times the density of the dispersed particles or droplets. If the dispersed phase is subsequently polymerized the density of the droplets or particles of the dispersed phase may change and typically increase. Alternatively, if the droplets of the dispersed liquid were to descend through the suspension medium, the density of the suspension medium may be from about 0.98 to about 0.90 times the density of the droplets of dispersed liquid.

The continuous phase is suitably any inert liquid which is immiscible with the dispersed phase (e.g. partially polymerized monomer or polymer in monomer solution). The term "immiscible" meaning less than about 1 weight percent of the dispersed liquid is miscible (or soluble) in the suspending liquid (i.e. the continuous phase does not solvate more than about 1 weight percent of the dispersed phase). Preferably less than about 0.1, weight percent of the dispersed phase is miscible in the suspending continuous liquid.

Typically, the continuous phase (suspending medium) is water. However, mixtures of water with one or more water-miscible organic liquids may be used. The addition of organic liquids which are immiscible with the dispersed phase and may or may not be immiscible with the continuous phase, and salts may be used to vary (increase) the density of the continuous phase. Preferably, water is employed as the continuous phase.

The continuous phase (suspending medium) may contain a surfactant or suspending aid. However, it is also possible to add a stabilizing amount of the suspending aid to the dispersed phase prior to dispersion. For polymerization suitable suspending aids are those materials which stabilize the monomer or partially polymerized monomer or monomer/polymer solution phase as spheroidal droplets of a desired size and which hinder the coalescence or uncontrolled breakage of the droplets.

The suspension stabilizer should be capable of forming a surface between the continuous phase and the dispersed particles or droplets having an interfacial tension of not less than 3, preferably not less than 8, most preferably greater than or equal to 12 dynes/cm. In the absence of the stabilizer, the above interfacial tension values are also the minimum values required between continuous and dispersed phases.

Suspension stabilizers are well known in the art and comprise organic stabilizers, carboxymethy cellulose, gelatine, agar, polyvinyl pyrrolidine, polyacrylamide; inorganic stabilizers, such as alumina, bentonite, magnesium silicate; surfactants, such as sodium dodecyl benzene sulfonate; or phosphates, like tricalciumphosphate, disodiumhydrogen phosphate, optionally in combination with any of the stabilizing compounds mentioned earlier. In some cases the stabilizer effectiveness may be enhanced by using an extender. One skilled in the art may readily determine the usefulness of any particular stabilizer or combination of stabilizers and/or extenders. The amount of stabilizer may suitably vary from 0 up to 10 weight %, usually 0.01 to 10, preferably 0.1 to 8, most preferably 0.1 to 5% by weight, based on the weight of the continuous phase. If the suspending aid or stabilizer is added to the dispersed liquid it may be added in an amount to provide the same concentration of the stabilizer in the continuous phase. Typically, a suspension stabilizer increases the viscosity of the continuous phase, affecting the motion of bubbles and of the dispersed particles in a way previously discussed.

The amount of the dispersed phase in the continuous phase can be from about 0.01 to 60 volume %, preferably from about 10 to 50 vol. %, most preferably from about 15 to 40 vol. %.

Typically, the dispersed particles or droplets will have a size from about 0.1 to 10 mm, preferably from 0.3 to 3 mm, most preferably from 0.5 to about 2 mm.

The dispersed droplets or particles may be further processed or polymerized in the continuous phase. If further processing of the dispersed phase includes polymerization of the dispersed monomer or partially polymerized monomer or solution of polymer in monomer, the continuous phase will be heated to temperatures up to 135° C., typically not more than 130° C. Typically the polymerization will be to not less than 95%, preferably 99%, most preferably 99.5% or greater conversion.

The present invention will now be illustrated by the following non-limiting examples, all of them comprising the dispersed phase obtained by pressure atomization of partially polymerized styrene monomer, which was suspended according to the first preferred mode of low-pressure gas injection, in a continuous phase comprising water and stabilizer.

Experimental Set Up

Figure 1:
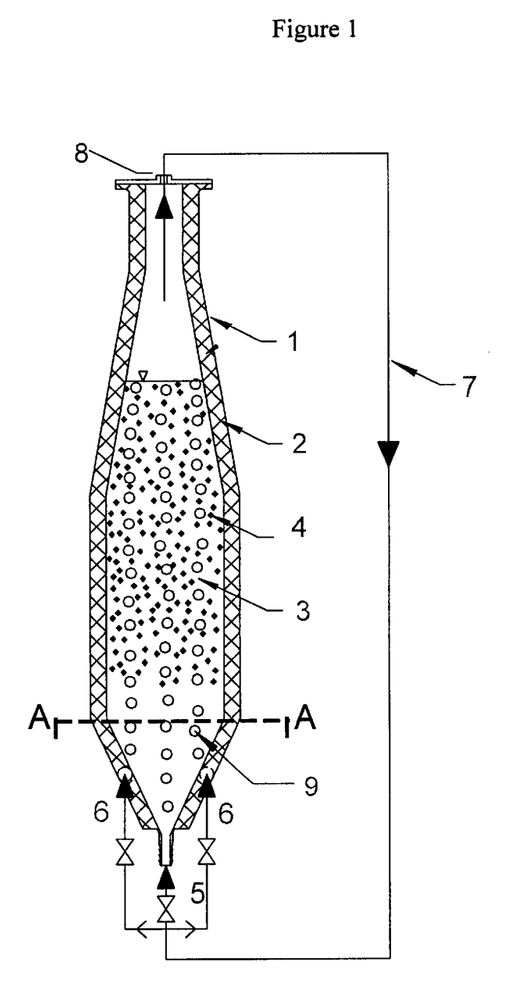
FIG. 1 is a schematic diagram of the vessel used to conduct the experiments.
Figure 2:
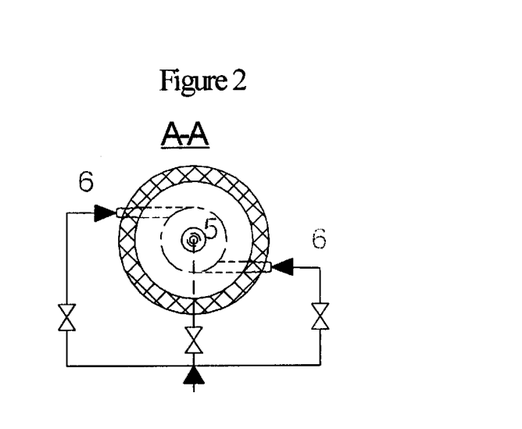
FIG. 2 is a sectional view at a—a of FIG. 1.

The experimental set up is schematically shown in FIG. 1.

In FIG. 1 a reactor vessel 1 having a heated jacket 2 was partially filled with a continuous water phase 3 mixed with the stabilizing agent and a dispersed phase 4 of partially polymerized styrene monomer. At the bottom of the reactor is a vertical gas injection port 5 and on the sides of the bottom half of the reactor are two tangential injection gas ports 6. An exit line 7 draws gas from the top of the reactor above the free surface of the continuous phase 3 and gas can be either removed to the exhaust stack or recirculated, using a blower, back to injection ports 5 and 6 to inject gas back into the continuous phase in the vessel. Nitrogen was selected as the injection gas and was introduced into the injection ports at gauge pressure of less than 0.05 bar generating strings or streams of large bubbles 9, with approximate diameter of 15–20 mm.

Experiment 1

Figure 3:
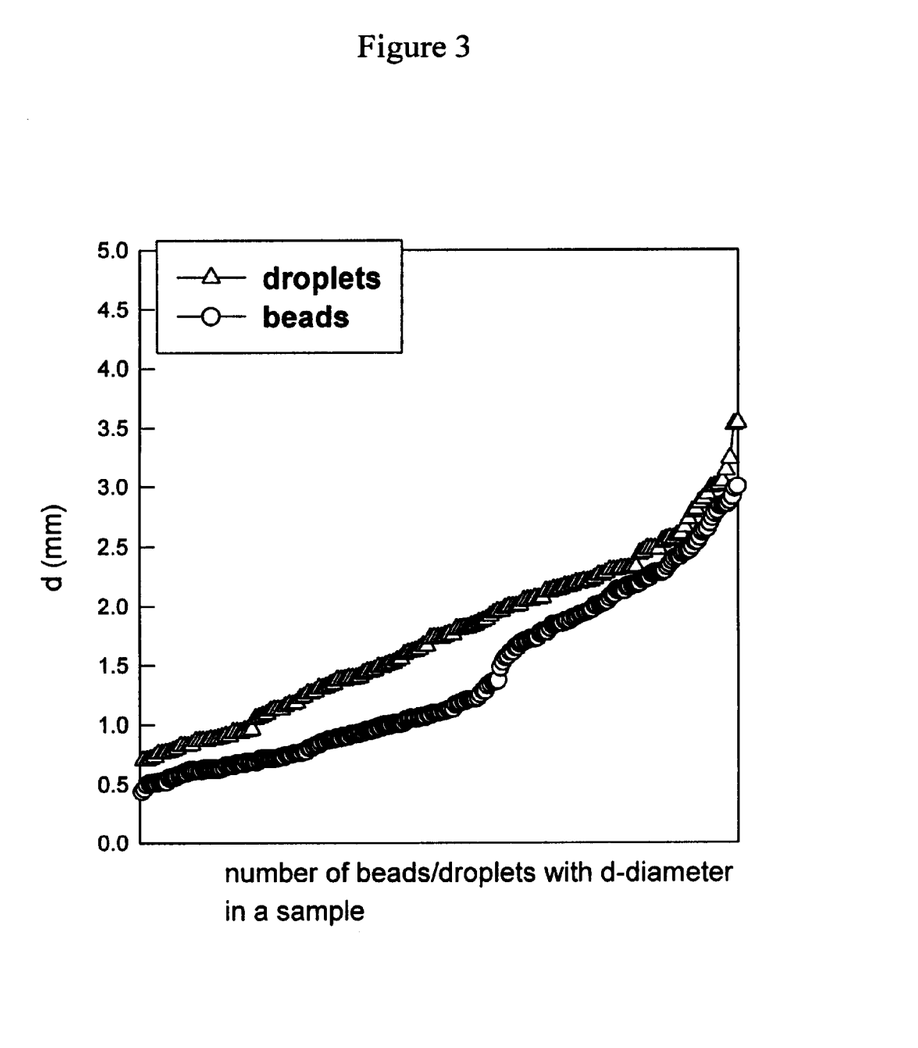
FIG. 3 is a comparison of the initial size distribution of pressure atomized droplets of partially polymerized styrene monomer and the resulting beads, which were polymerized in a flow pattern of the present invention in accordance with Experiment 1. For both samples, the droplets and the beads were selected at random from the respective populations.

The dispersed phase was styrene monomer prepolymerized to 35 wt % mixed with benzoyl peroxide (BPO) initiator, pre-heated to ~40° C. and then dispersed into the jacketed reactor containing the continuous phase comprising water and 3 wt % polyvinyl alcohol as a stabilizer, the continuous phase at ambient temperature. The initial sizes of the monomer droplets had a relatively wide distribution and they were measured by collecting a random sample and analyzing it via camera under a microscope. Initially, the dispersed phase had a density lower than continuous phase and the droplets would have formed a layer floating at the free surface of the continuous phase in the reactor. To distribute the droplets within the reactor volume, nitrogen was injected through the central and two tangential injection ports in the bottom part of the reactor and the resulting stream of bubbles created a flow pattern where the dispersed droplets were suspended. To start the polymerization process the reactor contents were heated to 90° C. and the temperature was maintained for the subsequent ~5 hrs. As polymerization progressed, the dispersed droplets started to sink as their density changed from <0.9 g/cm3 to ~1.1 g/cm3. A random sample of the fully polymerized bead product was analyzed for its size distribution and compared with the initial size distribution of the droplets, as shown in FIG. 3. The size of beads is smaller than the droplets due to density changes, but the overall shape of the initial droplet size distribution has been retained in the size distribution of the bead product.

Experiment 2

Figure 4:
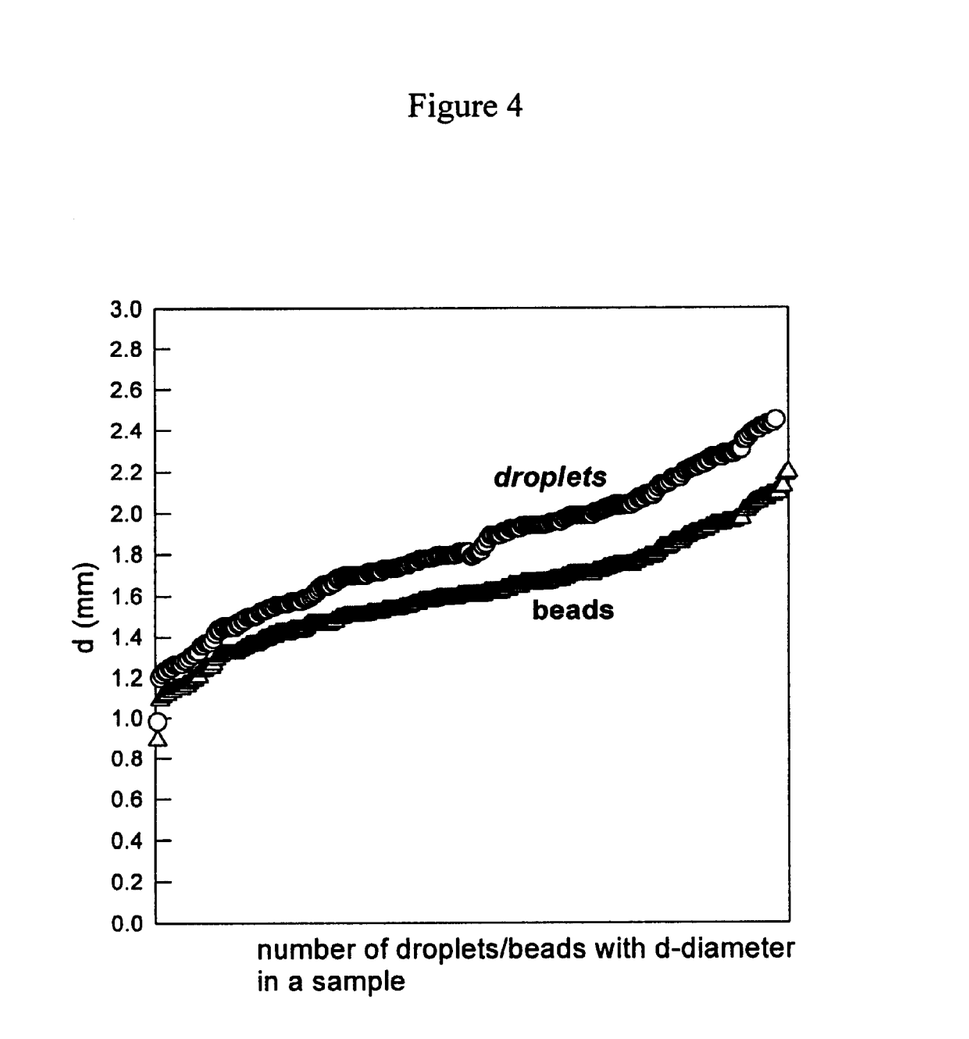
FIG. 4 is a comparison of diameters of the pressure atomized droplets of styrene monomer partially polymerized to 35%, the droplets taken as a random sample, and the resulting polymerized beads, which were polymerized in a flow pattern of the present invention in accordance with Experiment 2, taken also as a random sample.
Figure 5:
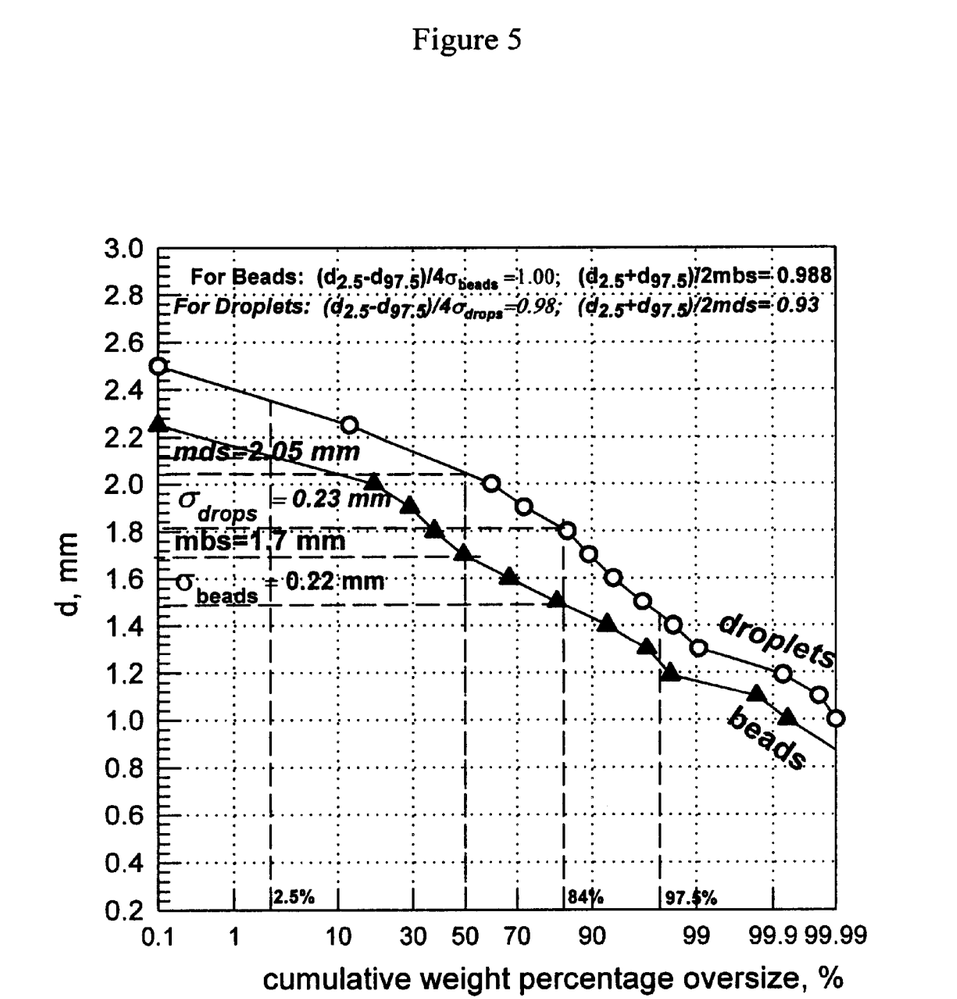
FIG. 5 shows the comparison of the size distributions (cumulative weight percentage oversize) of the pressure atomized droplets of partially polymerized styrene monomer and the resulting polystyrene beads polymerized in flow pattern of the present invention in accordance with Experiment 2, and whose sizes were shown in FIG. 4.

The dispersed phase was also styrene monomer prepolymerized to 35 wt % and mixed with BPO initiator, then pre-heated to ~40° C. and dispersed into the jacketed reactor containing the continuous phase which comprised water and 3 wt. % polyvinyl alcohol as a stabilizer. The initial size distribution of the monomer droplets was measured by collecting a sample and analyzing it via camera under a microscope (7×magnification). To distribute the droplets within the reactor volume, nitrogen was injected through two tangential injection ports located above the bottom of the reactor and through the port centrally located in the reactor bottom. The polymerization process was completed after approximately 5 hrs, keeping the reactor contents at a temperature of ~90° C. The resulting polymerized beads were analyzed for size distribution, shown in FIG. 4, and compared with the initial size distribution of the droplets. The cumulative weight percentage oversizes were calculated for the droplets and the polymerized beads and compared, FIG. 5, and the results indicate that smaller droplets retained their size very well during the polymerization process (considering change of density) while large droplets were more prone to some secondary breakups. However, the secondary breakups of the largest droplets slightly improved the overall size distribution of the product making it more uniform than the initial size of the droplets.

Experiment 3

The dispersed phase was styrene monomer prepolymerized to 15 wt % and dispersed into a vessel containing a continuous phase which comprised water and 3 wt.

Figure 6:
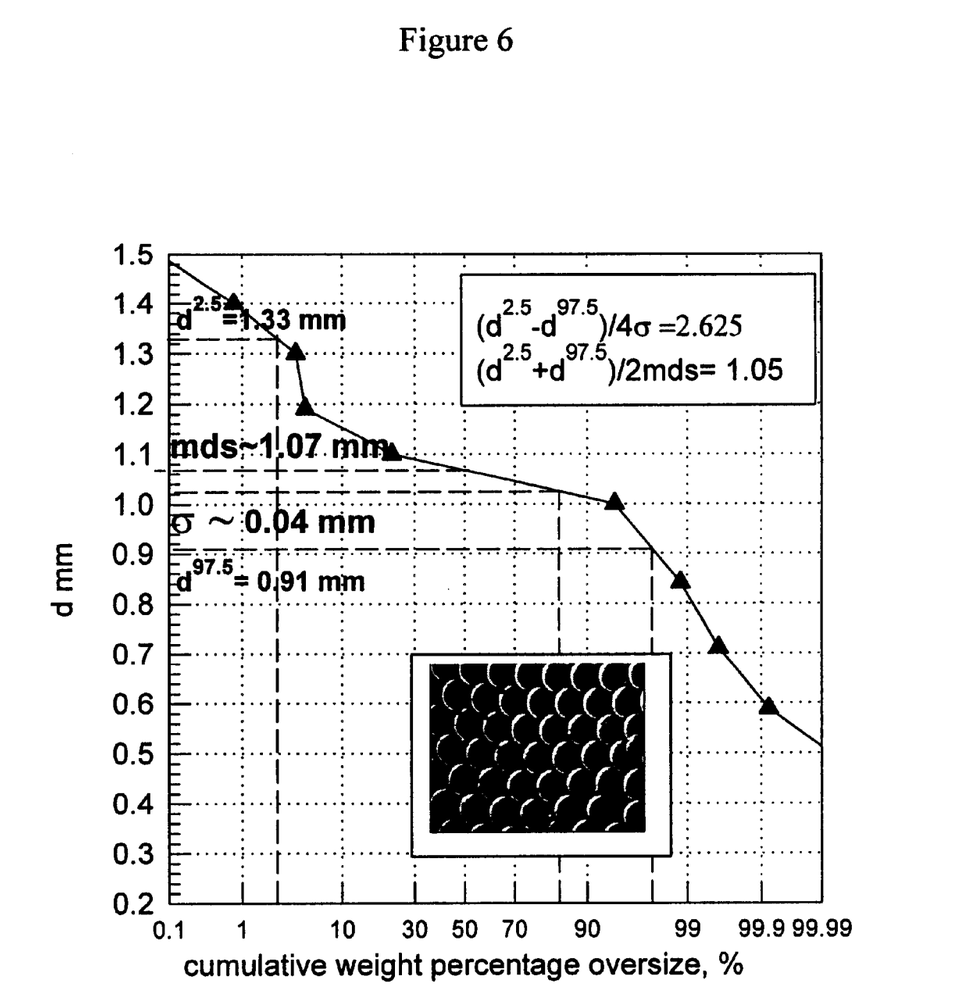
FIG. 6 shows the initial size distribution of the droplets obtained by pressure atomizing styrene pre-polymerized to 15% into a continuous phase comprising water with dissolved stabilizer (PVA), in accordance with Experiment 3.
Figure 7:
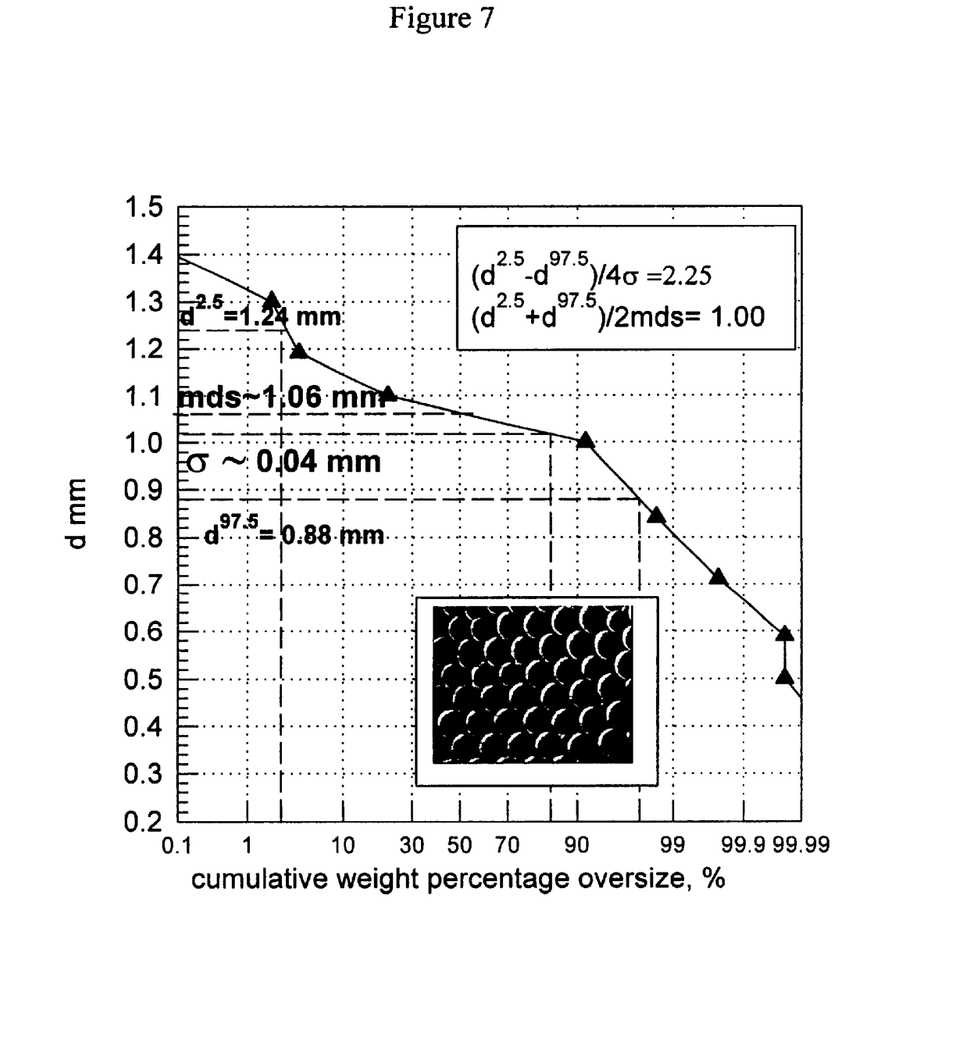
FIG. 7 shows the particle size distribution of the droplets shown in FIG. 6, after circulating for 1 hr 20 minutes in the flow pattern of the present invention in accordance with example 3, the size distribution preserved and identical to the initial size, as the small differences are within the measurement error.

% polyvinyl alcohol as a stabilizer. The initial size distribution of the monomer droplets was measured by collecting a sample and analyzing it via camera under a microscope (7×magnification) and it is shown in FIG. 6. The photograph of the initial droplets viewed via camera under the microscope is shown in the center of the Figure. The reactor content was at ambient temperature during the entire time of experiment. In the stationary continuous phase, the droplets floated to the surface and agglomerated forming a styrene layer after approx. 20 minutes. However, when nitrogen was injected into the vessel through two tangential injection ports located above the bottom of the vessel, creating the flow pattern of the present invention, the droplets were flowing without excessive agglomeration or breakups. After 1 hr. 20 minutes of circulating in the vessel, the droplets were analyzed for size distribution, which is shown in FIG. 7 and which was identical as the initial size distribution. The photograph of the droplets sampled after that time is presented in the center of the Figure. The negligibly small differences were within the measurement error.

What is claimed is:

1. A process for creating without mechanical agitation a flow pattern, in a continuous liquid phase contained in a reaction vessel and comprising a dispersed phase selected from the group consisting of solid particles which can also be coated or immiscible liquid droplets, the dispersed phase having a density different from the continuous phase and undergoing processing during which the particles or droplets need to preserve their size and particle size distribution and to remain submerged and uniformly distributed within the continuous phase, comprising continuously or periodically injecting into selected part(s) of the reaction vessel one or more streams of fluid immiscible and inert to the reaction vessel contents and having a density lower than the reaction vessel contents, so that not less than 90% of the initial particle size distribution of the dispersed phase is preserved, and retrieving this fluid above free surface of liquid phase.

2. The process according to claim 1, wherein the said fluid is injected at gauge pressure up to 15 bar into the reaction vessel and through injection ports located in the bottom portion of the reaction vessel and in the reaction vessel walls.

3. The process according to claim 2, wherein the fluid is recovered from the top of the reaction vessel above free surface of the continuous phase and reinjected through the ports.

4. The process according to claim 2, wherein the continuous liquid phase comprises from 0.1 to 60 volume % of a dispersed phase selected from the group consisting of solid particles which can also be coated or immiscible liquid droplets, the dispersed phase having an average particle diameter from 0.1 mm to 10 mm.

5. The process according to claim 2, wherein the density of the dispersed phase differs from the density of the continuous phase by ±20%.

6. The process according to claim 5, wherein the injected fluid is a gas not soluble in both phases.

7. The process according to claim 6, wherein the gas is selected from the group consisting of air and nitrogen.

8. The process according to claim 7 wherein the gas is injected into the bottom half of the reactor.

9. The process according to claim 8 wherein the gas is injected into the continuous phase at a gauge pressure less than 3 bar and forms streams of bubbles having diameters substantially larger than the average size of the dispersed phase particles or droplets.

10. The process according to claim 8 wherein the dispersed phase has a density lower than the continuous phase and the said gas being injected periodically at gauge pressure above 5 bar into the continuous phase to generate bubbles at least an order of magnitude smaller than the average size of dispersed particles or droplets, reducing the effective bulk density of the continuous phase.

11. The process according to claim 9, wherein the continuous phase comprises water.

12. The process according to claim 10, wherein the continuous phase comprises water.

13. The process according to claim 11, wherein the dispersed phase is selected from the group consisting of one or more monomers which may be emulsion or suspension polymerized and or solutions of polymers in one or more monomers which can be emulsion or suspension polymerized.

14. The process according to claim 13, wherein the monomers are selected from the group consisting of $C_{8-12}$ vinyl aromatic monomers which are unsubstituted or substituted by up to two substituents selected from the group consisting of $C_{1-4}$ alkyl radicals, acrylonitrile, methacrylonitrile, maleic anhydride, malimide, and $C_{1-4}$ alkyl esters of $C_{1-6}$ monocarboxylic acids.

15. The process according to claim 14, wherein the dispersed phase comprises from 100 to 60 weight % of styrene and from 0 to 40 weight % of one or more monomers selected from the group consisting of methyl methacrylate, ethyl methacrylate, butyl acrylate, methyl acrylate, and ethyl acrylate.

16. The process according to claim 15, wherein in the dispersed phase per se is selected from the group consisting of monomer polymerized up to 45% conversion, and a solution of monomers comprising up to 45%, of polymer of one or more of the solvent monomers.

17. The process according to claim 16, further comprising subjecting the dispersed liquid phase to polymerization to not less than 95% conversion at a temperature finally reaching up to 130° C.

18. The process according to claim 12, wherein the dispersed phase is selected from the group consisting of one or more monomers which may be emulsion or suspension polymerized and or solutions of polymers in one or more monomers which can be emulsion or suspension polymerized.

19. The process according to claim 18, wherein the monomers are selected from the group consisting of $C_{8-12}$ vinyl aromatic monomers which are unsubstituted or substituted by up to two substituents selected from the group consisting of $C_{1-4}$ alkyl radicals, acrylonitrile, methacrylonitrile, maleic anhydride, malimide, and $C_{1-4}$ alkyl esters of $C_{1-6}$ monocarboxylic acids.

20. The process according to claim 19, wherein the discontinuous phase comprises from 100 to 60 weight % of styrene and from 0 to 40 weight % of one or more monomers selected from the group consisting of methyl methacrylate, ethyl methacrylate, butyl acrylate, methyl acrylate, and ethyl acrylate.

21. The process according to claim 20, wherein in the dispersed phase per se is selected from the group consisting of monomer polymerized up to 45% conversion, and a solution of monomers comprising up to 45%, of polymer of one or more of the solvent monomers.

22. The process according to claim 21, further comprising subjecting the dispersed liquid to polymerization to not less than 95% conversion at a temperature up to 130° C.

23. A process according to claim 7, to alter the initial particle size distribution of a dispersed phase in a continuous phase comprising introducing a gas into the continuous phase at a rate to induce within the continuous phase a flow pattern with a level of turbulence to cause a breakup of the 15% of the largest droplets or particles in the population, and to a create more uniform size distribution of the dispersed phase.

24. A process for creating without mechanical agitation a flow pattern, in a continuous liquid phase contained in a reaction vessel and comprising 0.1 to 60 volume % of a dispersed phase selected from the group consisting of solid particles which can also be coated or immiscible liquid droplets, the dispersed phase having an average particle diameter from 0.1 mm to 10 mm and a density different from the continuous phase and undergoing processing during which the particles or droplets need to reduce the initial particle size distribution and to remain submerged and uniformly distributed within the continuous phase, comprising continuously or periodically injecting into selected part (s) of the reaction vessel one or more streams of fluid immiscible and inert to the reaction vessel contents and having a density lower than the reaction vessel contents, to cause a secondary break up of at least 85% of the dispersed phase droplet population creating a smaller size of the overall particle size distribution of the dispersed phase, and retrieving this fluid above free surface of the continuous liquid phase.

* * * * *